Sept. 28, 1965

W. C. VIRBILA 3,208,465

PROCESS CONTROLLER

Filed Sept. 1, 1961

Sept. 28, 1965   W. C. VIRBILA   3,208,465
PROCESS CONTROLLER
Filed Sept. 1, 1961   7 Sheets-Sheet 3

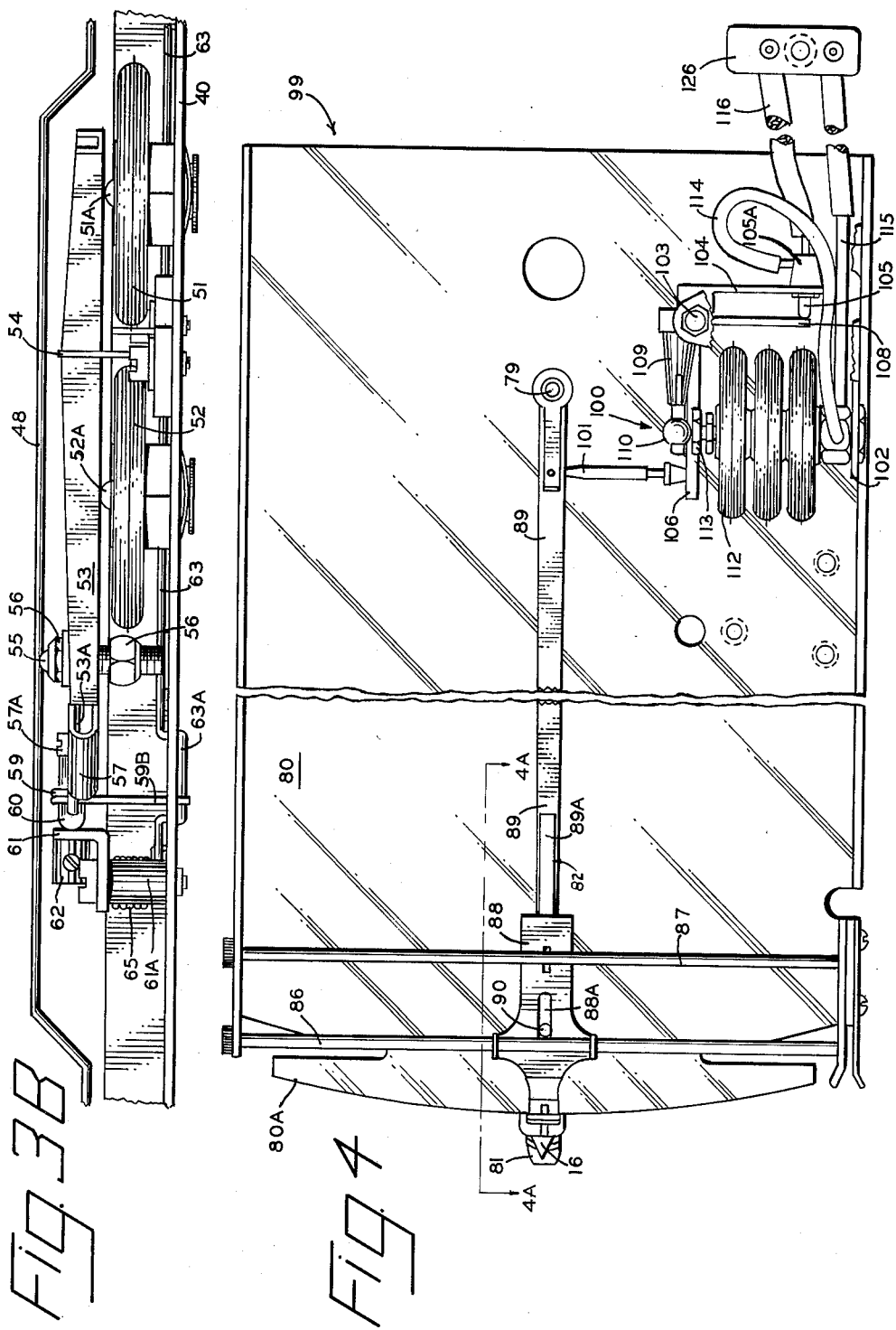

Sept. 28, 1965 W. C. VIRBILA 3,208,465
PROCESS CONTROLLER
Filed Sept. 1, 1961 7 Sheets-Sheet 6
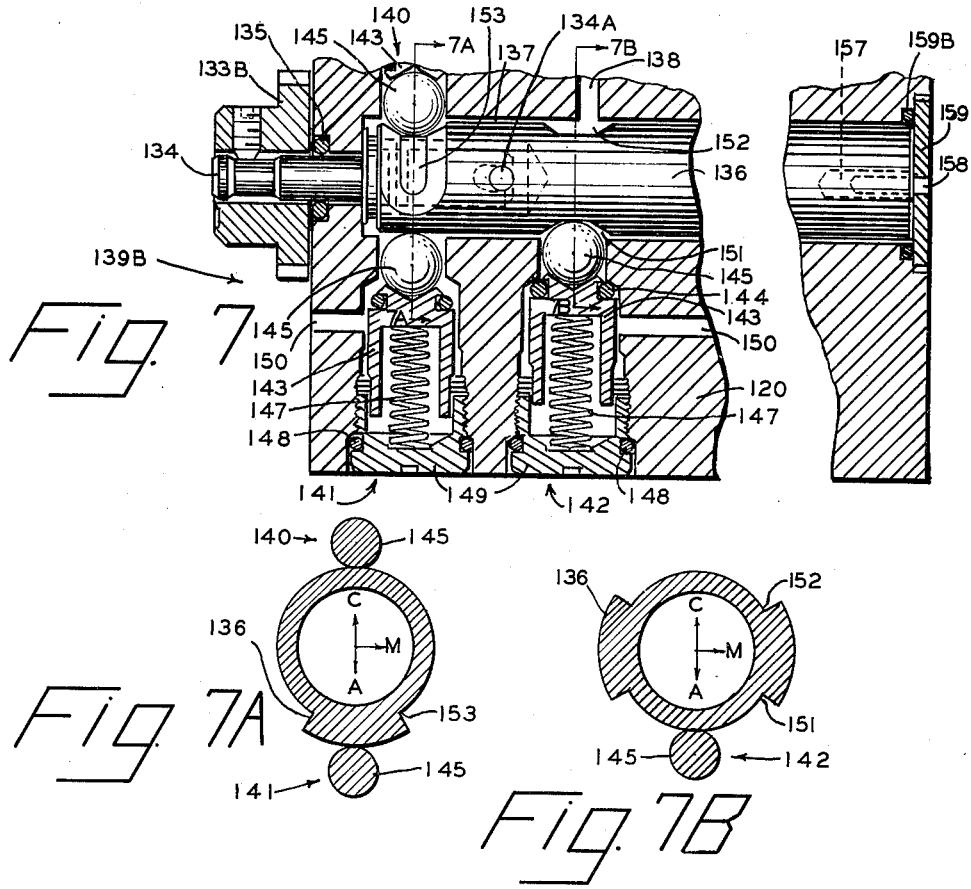
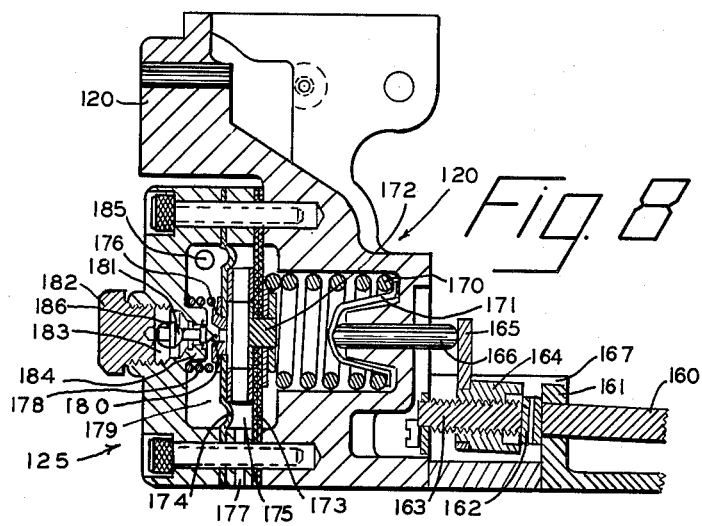

Sept. 28, 1965 W. C. VIRBILA 3,208,465
PROCESS CONTROLLER
Filed Sept. 1, 1961 7 Sheets-Sheet 7

United States Patent Office 3,208,465
Patented Sept. 28, 1965

3,208,465
PROCESS CONTROLLER
William C. Virbila, Oakville, Conn., assignor to The Bristol Company, Waterbury, Conn., a corporation of Connecticut
Filed Sept. 1, 1961, Ser. No. 135,539
20 Claims. (Cl. 137—85)

This invention relates to control systems and more particularly to such systems for indicating the magnitudes of one or more variable conditions in a process cycle and for operating a final control element.

There has been developed a system for controlling the performance of particular functions in a process cycle which is extremely accurate and highly efficient in operation. One such system is disclosed, for example, in Willam C. Virbila Patent 2,852,197, granted September 16, 1958. Systems of this type customarily include a fluid pressure mechanism which is arranged to develop a pressure signal representative of the magnitude of the variable condition. The thus developed signal is applied to a centrally located exhibiting apparatus where it is recorded on a continuously moving strip chart. The signal also is applied through a controller mechanism to the final control element to thereby automatically control the particular process function in accordance with the magnitude of the measured condition.

The exhibiting apparatus of the system preferably is mounted on a panel in a common location or control room at a point remote from the control valve or other final control element. An exhibiting apparatus of particular utility for use in the control system of the present invention is disclosed in the copending patent application Serial No. 135,471 of William C. Virbila filed concurrently herewith.

In systems of the foregoing type, it is often advantageous to also permit control of the final control element through the use of manually operated means at the remotely located control station. Additionally, for some applications it is desirable to provide for the automatic control of the final element through the use of a pair of controller mechanism connected for "Cascade" operation, that is, for operation in which a first controller mechanism (often called the "master controller") automatically positions the set point in a second controller mechanism (often called the "slave controller").

Heretofore, difficulties have been encounterd in the provision of automatic control systems which are also suitable for manual and/or cascade operation, and these difficulties have been of special moment in the transfer of the system from one type of operation to another. For example, in many previous systems of this type, discrepancies between the pressure signal applied to the final control element immediately before the transfer and that applied immediately after the transfer resulted in a deleterious "bump" in the process being controlled, and prior attempts to eliminate the adverse effects of this bump were not altogether successful in practice. In addition, it frequently was difficult heretofore to correlate the values indicated on the exhibiting apparatus with particular control functions for effective manipulation of the control devices. Furthermore, many such prior systems necessitated an interruption in the automatic control operation upon the removal of the exhibiting apparatus, for adjustment purposes, replacement of the chart, etc.

One general object of this invention, therefore, is to provide a new and improved control system for indicating the magnitudes of one or more variable conditions in a process cycle and for operating a final control element.

More specifically, it is an object of this invention to provide such a system wherein the control function is quickly and easily transferred between a plurality of control positions.

Another object of this invention is to provide a system of the character indicated which enables the elimination of a "bump" during sudden transitions from one control position to another.

Another object of the invention is to provide a system of the above nature in which pressure differences in the system are reduced to zero prior to switching between control positions.

Still another object of the invention is to provide a control system in which values of particular control functions are visually interrelated for efficient and effective manipulation of the control devices.

A further object of the invention is to provide a control system having an indicating and recording mechanism which is readily removable from a supporting panel without interfering with the performance of the control functions.

A still further object of the invention is to provide a control system utilizing comparatively simple mechanical and pneumatic components, which instrument is economical to manufacture and thoroughly reliable in operation.

Other objects as well as advantages of the present invention will be understood more clearly and fully from the following detailed description of a preferred embodiment thereof, when read in conjunction with the accompanying drawings, in which:

FIGURE 3B is an enlarged fragmentary sectional view taken along the line 3B—3B in FIGURE 3;

FIGURE 4 is a bottom plan view of the top plate assembly of the instrument;

FIGURE 7 is a fragmentary sectional view taken generally along the line 7—7 in FIGURE 5;

FIGURE 7A is a partially schematic sectional view taken along the line 7A—7A in FIGURE 7;

FIGURE 7B is a partially schematic sectional view taken along the line 7B—7B in FIGURE 7;

FIGURE 8 is a fragmentary sectional view taken generally along the line 8—8 in FIGURE 5.

Figure 1:
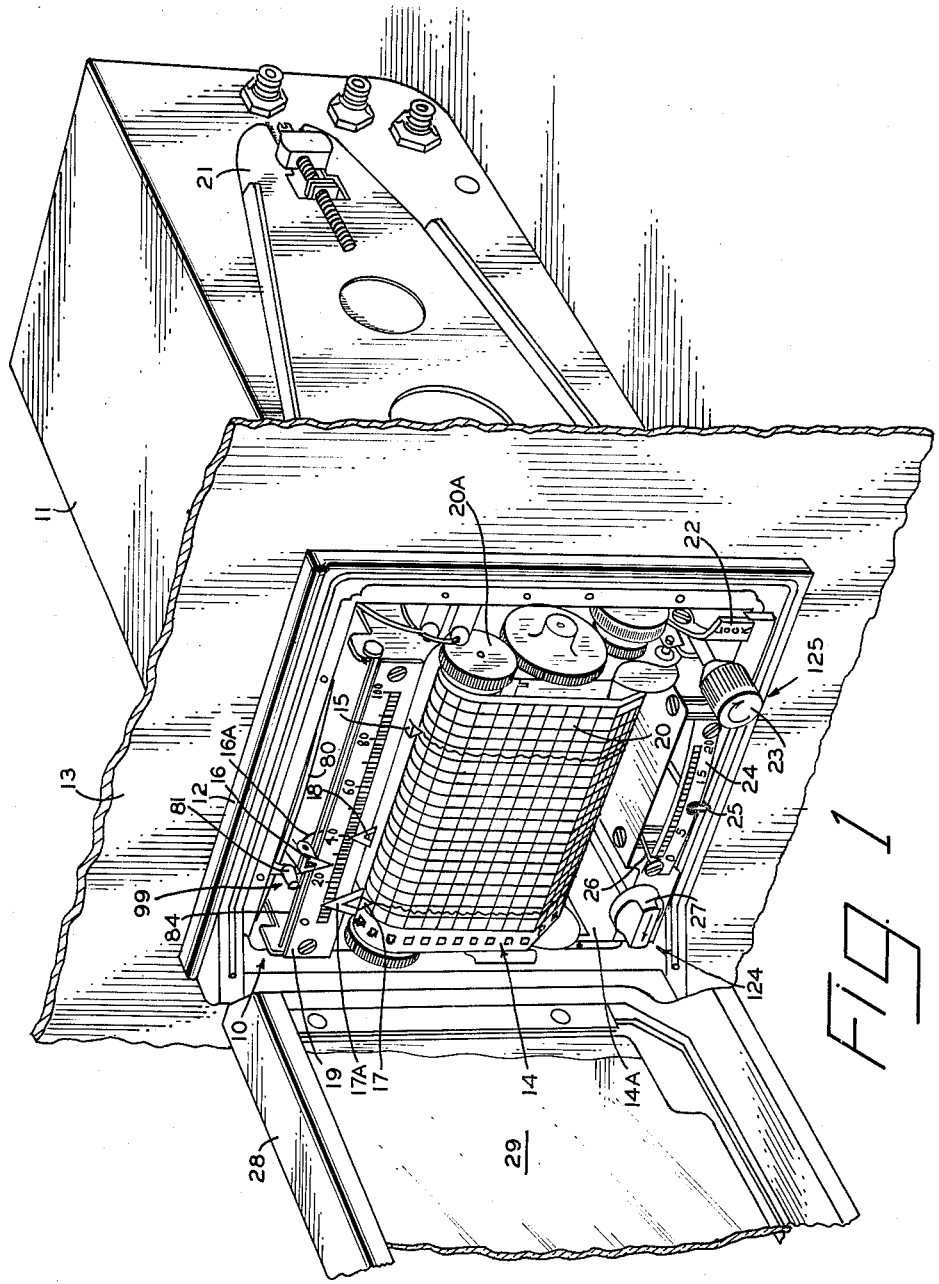
FIGURE 1 is a perspective view of an indicating, recording and controlling instrument constructed in accordance with a preferred embodiment of the invention.

Referring initially to FIGURE 1 of the drawings, there is shown a multi-point indicating, recording and controlling instrument 10 which is removably secured within an enclosing housing or case 11. The case 11 is arranged for mounting in a suitable rectangular aperture formed in a panel member 13 and is supported therefrom by cantilever bracket members 21 on either side of the case. Attached to the front of the case is a frame or bezel 12 to which is hinged a door 28 having a transparent panel 29 of glass, plastic, or other transparent material.

The several instrument components enclosed within the case 11 include an assembly 14 for indicating and recording the magnitudes of a plurality of variable conditions, a pressure transmitter 99 arranged to develop a reference pressure which is supplied to the controller mechanism of the system, a pressure switching assembly 124 for transfering the control functions of the instrument between a "Cascade" position, a "manual" position and an "Automatic" position and a pressure regulator 125 adapted during manual operation to deliver fluid at varying output pressures. In the discussion which follows, there will first be given a detailed description of each of these elements in connection with FIGURES 1–8, followed by a discussion of the manner in which these elements are incorporateed in the control system of FIGURE 9.

*Indicator-recorder assembly*

The indicator-recorder assembly 14 includes a retractable chassis 14A releasably secured within the housing 11. As more fully described in the copending patent application referred to above, the indicator-recorder 14 includes a recording chart 20 with its driving mechanism 20A, a recording pen 15, a second recording pen 17 which is combined with an indicator pointer 17A and a separate indicator pointer 18. The pens 15 and 17 cooperate with the chart 20, while the pointers 17A and 18 are associated with a linear scale plate 19 affixed adjacent the upper portion of the retractable chassis 14A.

Also provided within the housing 11 are a manually-operated set point indicator 16 associated with the scale plate 19, a scale plate 24 fixedly secured adjacent the lower portion of the housing, two indicating pointers 25 and 26 which cooperate with the plate 24, a pressure adjusting knob 23 and a switching knob 27. The construction and mode of operation of these elements and the control mechanism attendant thereupon will become more fully apparent from the discussion which follows.

Figure 2:
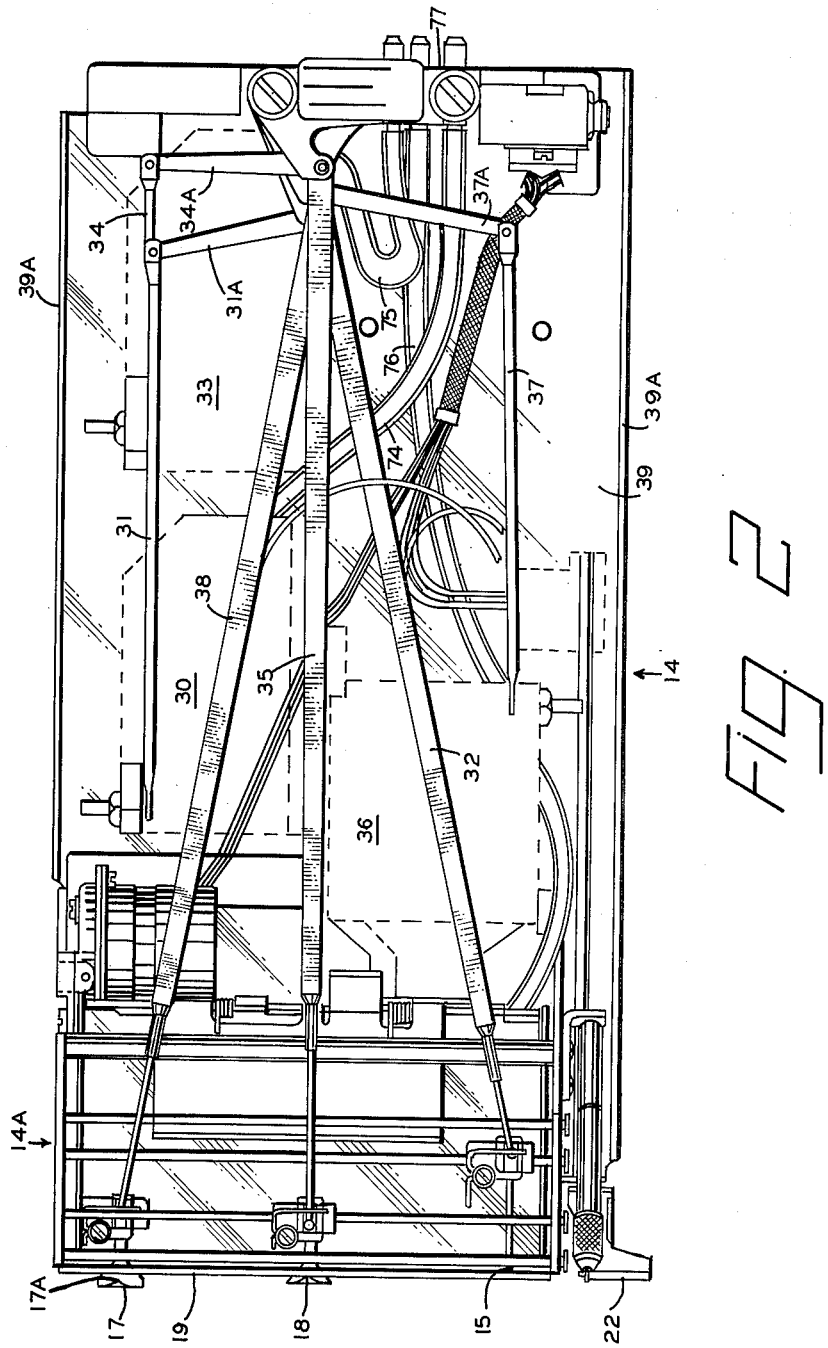
FIGURE 2 is a top plan view of the demountable chassis assembly of the instrument.

As best shown in FIGURE 2, the component parts of the demountable indicator-recorder assembly 14 are mounted on an elongated sheet metal base plate 39 whose longitudinal edges are formed into side rails 39A. In this figure, the assembly 14 is shown completely removed from the case 11. Adjacent the left end of the plate 39, as viewed in FIGURE 2, (which may be called the "front end"), are mounted suitable pins (not visible in the drawings) which engage corresponding holes in the case 11 for centering and securing the assembly in relation to the case. A latch tab 22 provides readily accessible means for locking the assembly in place within the case. Also mounted adjacent the left end of the base plate 39 are the indicator scale plate 19, the pens 15 and 17, the pointers 17A and 18, the recording chart 20 (FIGURE 1) and the chart drive mechanism 20A.

Three fluid pressure transducer elements 30, 33 and 36, are mounted on the base plate 39 and are respectively connected by conduits 74, 75 and 76 to a plug-in terminal block 77, whence demountable connection is made to a terminal element 123 (FIGURE 5) on a mounting block 120 at the rear of the case 11. Although the transducer elements 30, 33 and 36 have not been illustrateed in detail in FIGURE 2, their locations are shown by dash lines, and they are more fully disclosed in the above-mentioned copending patent application. As will become more fully apparent hereafter, the conduits 74, 75 and 76 are supplied with pressure signals representative of desired measurements. These signals initiate corresponding deflections of the transducer elements. The deflections of the transducer 30 are transmitted to the recording pen 15 by a linkage system comprising arms 31, 31A and 32. Similarly, the deflections of the transducer 33 are conveyed by a linkage system comprising arms 34, 34A and 35 to the control indicator 18, and those of the transducer 36 are conveyed by a linkage system comprising arms 37, 37A and 38 to the recording pen 17 and the control indicator 17A.

Figure 3:
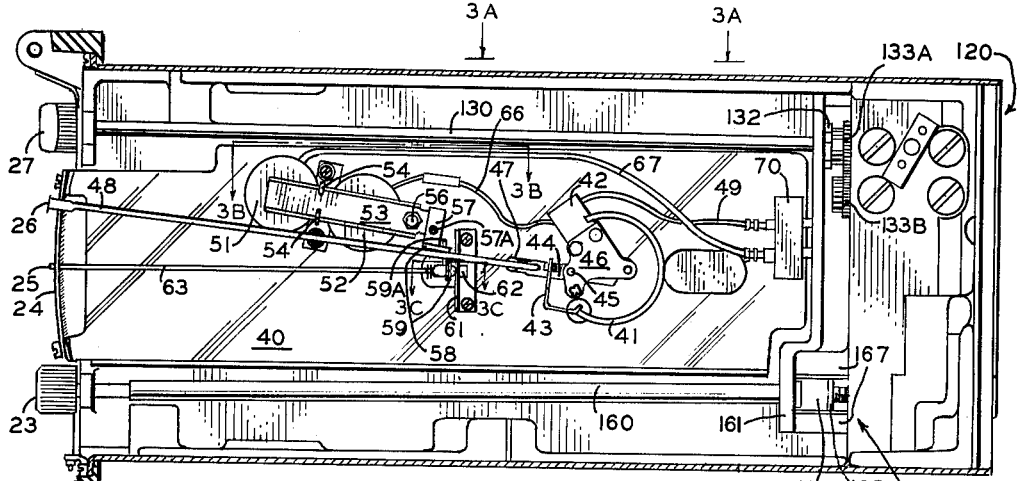
FIGURE 3 is a top plan view, with certain parts shown in section, of the bottom plate assembly of the instrument.
Figure 3A:
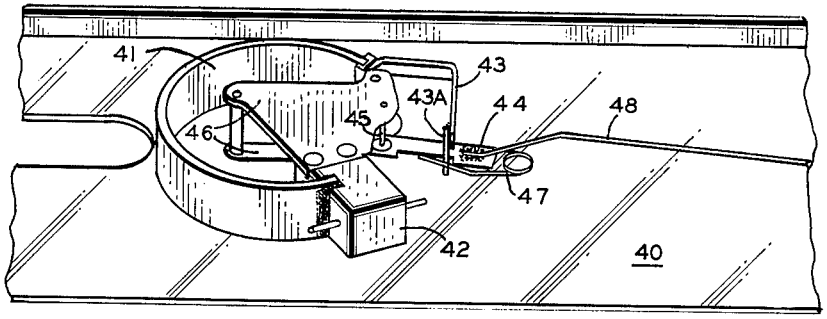
FIGURE 3A is an enlarged fragmentary perspective view, looking generally in the direction of the arrows 3A—3A in FIGURE 3, of a portion of the bottom plate assembly, with certain parts omitted for purposes of clarity.

Fixedly secured to the bottom of case 11 and normally lying underneath the base plate 39 is a stationary sub-base 40 (see especially FIGURES 3 and 3A). The base 40 supports an indicator system which actuates the indicating pointers 25 and 26 associated with the scale 24. This indicator system includes a Bourdon tube element 41 which is anchored at one end to a pillar block 42 secured to the base 40. Fixed to the free end of the Bourdon tube for movement therewith is a right-angle member 43 having a vertical pin 43A mounted at its outer end. This pin frictionally engages a radial arm 44 which is pivotably supported adjacent one end thereof by an upstanding pin 45 carried between two horizontal plates 46 fixed to the pillar block 42. The arm 44 is biased by a torsion spring 47 which engages the pin 43A, holding it in contact with the arm. The radial arm 44 is extended by an index arm 48 and terminates in the pointer 26 at the scale plate 24.

Figure 3C:
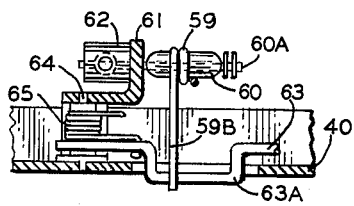
FIGURE 3C is an enlarged fragmentary sectional view taken along the line 3C—3C in FIGURE 3, with certain parts omitted for purposes of clarity.

Also mounted on the sub-base 40 are two capsular pressure elements 51 and 52 which are juxtaposed in a manner such that their deflectable sides are facing upwardly and in side by side relation. As best shown in FIGURE 3B, the deflectable faces of the elements 51 and 52 are provided with balls 51A and 52A, respectively, which each engage a horizontally extending bridge member 53, having a channel section for stiffness. This bridge member is suspended from flexures 54 at a point intermediate the elements 51 and 52 and extends in a substantially longitudinal direction with respect to the sub-base. Near the rearwardly directed end of the member 53 (the left end, as viewed in FIGURE 3B) is formed a slot which encloses a threaded post 55 having two vertically spaced nuts 56 thereon which act as stops to limit the motion of the bridge member. On a further extended portion 53A at this end of the bridge member is fixed one leg of a U-shaped member 57. The position of the other leg of this member is adjustable by a screw 57A. This latter leg carries a longitudinally extending contact pin 58 (FIGURE 3) welded to its outer extremity which is in sliding engagement with the transverse, horizontal end portion 59A of a relatively stiff wire 59. As best shown in FIGURES 3B and 3C, the central portion of the wire 59 is bent in several turns around a horizontal, longitudinally extending pivot pin 60. This pin is formed with a bearing portion of reduced diameter and is pivotally supported on a small-diameter shaft 60A which protrudes from an aperture in a mounting member 61, the pin being retained in place by a collar 62. Two studs 61A on the plate 40 support this mounting member. The remaining end portion 59B of the wire 59 extends downwardly and frictionally engages an index arm 63 at an offset portion 63A thereof. The index arm 63 is pivoted about an upstanding shaft 64 on the sub-base 40.

With this arrangement, pivotal motion of the bridge member 53 about the flexures 54 in response to the deflection of the pressure elements 51 and 52 moves the contact pin 58 at the rearwardly directed end of the bridge member in a vertical direction, thus rotating the end portion 59A of wire 59 about the axis of the pivot pin 60. The opposite end portion 59B of the wire also rotates about the pivot pin axis to move the index arm 63 in a horizontal plane about the shaft 64. A torsion spring 65 surrounds this shaft and provides bias in a direction to maintain the end portions 59A and 59B of the wire 59 in contact with the pin 58 and the arm 63, respectively. With this arrangement, the deflection of the pressure capsules is transmitted through the intermediate linkage to the pointer 25 associated with the scale plate 24.

As best shown in FIGURE 3, the pressure element 51 is connected by a conduit 67 to a plug-in terminal block 70 which is fastened to the sub-base 40 and which mates with receptacle members 122 (FIGURE 5) on the mounting housing block 120. The Bourdon tube 41 similarly is connected to the block 70 by a conduit 49, while the pressure element 52 is connected to the tube 41 by a conduit 66. The tube 41 and the pressure element 52 are thus connected in multiple, for purposes that will become more fully apparent hereafter.

*Pressure transmitting mechanism*

Figure 4A:
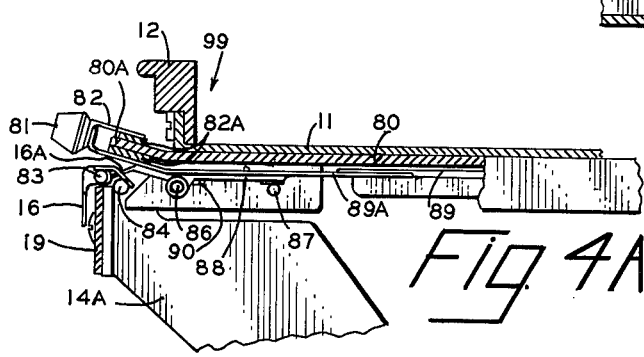
FIGURE 4A is a fragmentary sectional view taken along the line 4A—4A in FIGURE 4, together with certain additional parts.

Within the case 11 and attached to the top inner surface thereof is a mounting plate 80 (FIGURES 4 and 4A). The plate 80 supports the pressure transmitting mechanism 99 and is formed with an outer lip portion 80A having deep insets bounding the lip to allow it to be bent upwardly slightly independently of the main body portion of the plate. The outer edge of the lip 80A is of arcuate configuration, forming a sector of a circle. Riding on this edge is an adjustor carriage 82 to which is attached a manually controlled knob 81. As best shown in FIGURE 4A, the carriage 82 is hook-shaped at its outer extremity, to accommodate the curved lip of the mounting plate, and makes sliding contact with the lip through friction pads 82A. The carriage includes a rearwardly extending arm portion 89A which is fastened to an elongated index arm 89 pivotally supported on an axial rivet 79 (FIGURE 4) near the rear of the mounting plate 80.

Positioned immediately beneath the carriage 82 is an indicator plate 88 whose trailing portion slidably engages a transverse support rod 87 which is attached to bracket portions of the mounting plate 80. Spaced forward from this support rod is a second support rod 86, similarly disposed between side brackets of the plate 80, which makes sliding engagement with the indicator plate through suitable bearing holes formed in bent-over ear portions thereof. The plate 88 includes a longitudinal slot 88A adjacent the rod 86 which accommodates a depending pin 90 fixed to the carriage arm portion 89A. Thus, as the index arm 89 and the attached carriage 82 move radially about the pivot point 79, the carriage carries with it the indicator plate 88, the plate being constrained by its engagement with the rod 86 to move in a straight line.

The indicator plate 88 extends forwardly into juxtaposition with the scale plate 19, and its outer extremity accommodates a transverse pin 83. The pointer member 16 is formed with an inverted triangular face, and the upper corners are bent over to form tabs for bearing holes which engage the pin 83. The topmost portion of the member 16 is bent backwardly to form a hooked extension which is slotted to accommodate the forward portion of the plate 88. A torsion spring (not shown) surrounds the pin 83 and biases member 16 in a clockwise direction, as viewed in FIGURE 4A. In the normal position of the scale plate 19 (that is, with the retractable chassis 14A, and hence the scale plate, in place within the case 11), the hooked extension of the pointer member is urged by the spring into engagement with a transverse support rod 84 which is fixedly secured to the chassis in juxtaposition with the scale 19. Thus, when the chassis 14A, and the attached scale plate 19 and the rod 84, are withdrawn from the case 11, the pointer 16 is automatically rotated out of the way of the scale plate by the spring.

Figure 5:
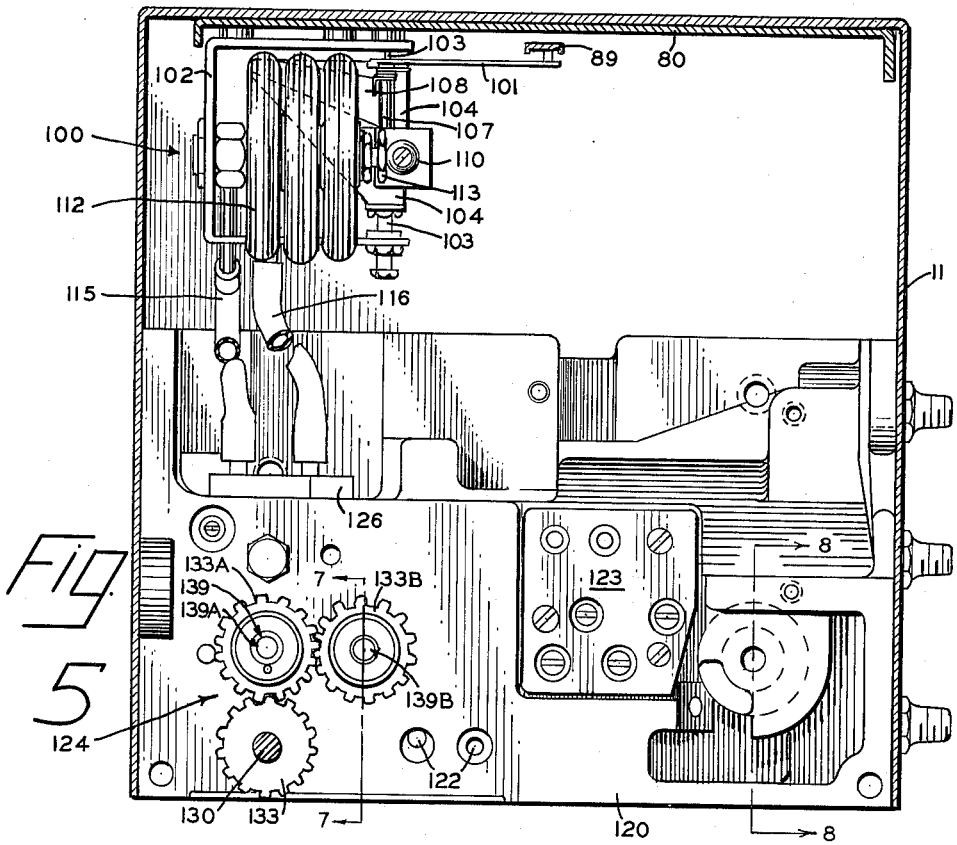
FIGURE 5 is a front elevational view of the rear interior face of the instrument housing, together with associated portions of the top plate assembly of FIGURE 4.
Figure 6:
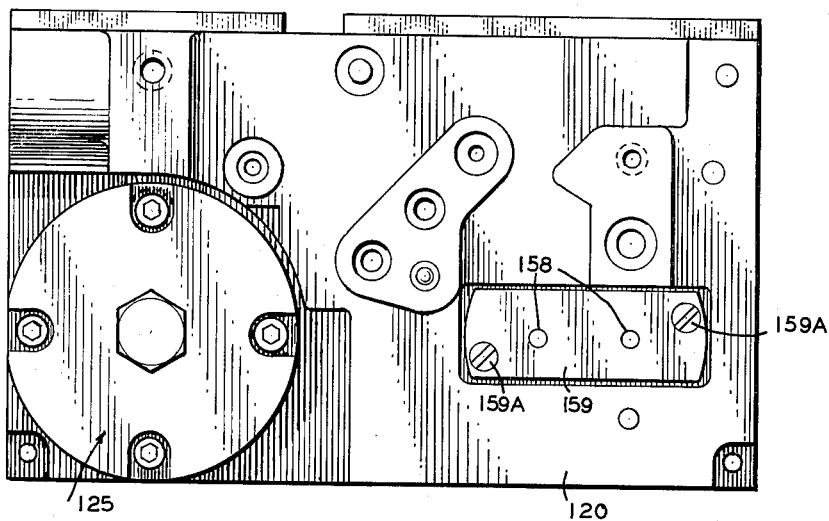
FIGURE 6 is a rear elevational view of a portion of the instrument housing.

As best shown in FIGURES 4 and 5, the set point arm 89 is linked by a member 101 adjacent the pivot 79 to a pressure transmitter assembly 100. The assembly 100 is supported from the top mounting plate 80 through a U-shaped mounting bracket 102. Pivotally carried intermediate the legs of this bracket, as at 103, is an upstanding nozzle mounting plate 104 which is provided with a horizontally extending arm 106 connected to the linkage arm 101. Motion of the set-point arm 89 is thus transmitted to the mounting plate 104. This plate extends outwardly from the pivots 103, and near its outer end is mounted a nozzle member 105 which is provided with a double connector block 105A for fluid pressure connections. Also pivotally carried intermediate the legs of the bracket 102, but provided for independent motion, is a shaft 107 having a flapper or obturator arm 108 in juxtaposition with the nozzle member 105. Fixed to the shaft 107, but at right angles to the flapper 108, is a follow-up arm 109 which terminates at its outer end in an adjustably extendable contact member 110.

One side of a multi-section flexible capsular bellows element 112 is attached to the bracket 102. The free side of the element 112 is provided with a contact pad 113 which is in engagement with the contact 110 on the arm 109. The bellows element is pneumatically connected by a conduit 115 to an output connection on a connector block 126 supported by the rear mounting block 120. The block 126 also includes an input connection which supplies air under constant pressure to the nozzle block 105A through a conduit 116. A conduit 114 interconnects the nozzle block and the bellows.

In operation, any changes in the position of the set point indicator 16 are transmitted by the arm 89, the link 101, the arm 106 and the plate 104 to the nozzle 105, thereby varying the position of the nozzle with respect to the flapper 108. With fluid under constant pressure applied to the nozzle through the conduit 116, a change in the relative positions of nozzle and flapper causes a variation in pressure within the nozzle block 105A which is reflected through the conduit 114 to the bellows 112. The movement of the bellows is of a magnitude and direction to operate through the arms 109 and 108 to restore the pressure equilibrium between the nozzle pressure drop and the pressure in the bellows required to produce that pressure drop. In this manner, therefore, the pressure transmitter 100 develops an output pressure in the conduit 115 which is representative of the position of the set point indicator 16. For a more detailed discussion of representative pressure transmitters useful in connection with the invention, reference may be had, for example, to the paper entitled "The Solution of Instrumentation Problems by the Pneumatic Null Balance Method" by C. B. Moore, in the periodical "Instruments," vol. 18 (1945), pages 598 and following, or to the book "Principles and Methods of Telemetering," by P. A. Borden and G. M. Thynell (Reinhold, 1948).

*Switching Assembly*

The switch knob 27 (FIGURES 1 and 3) is movable between three discrete positions. One of these may be referred to as the "Cascade" position, another, the mid-position, as the "Manual" position and the third as the "Automatic" position. The movements of the knob 27 are transmitted through the length of the case 11 by a shaft 130 which terminates in a detent cam 132, for positively indexing the shaft positions, and a gear 133 (FIGURE 5) supported adjacent the rear mounting block 120. The gear 133 forms a part of the switching assembly 124, as does a meshing gear 133A and a third gear 133B which is in meshing engagement with the gear 133A.

The gear 133A controls two, axially aligned, three-position valve units 139 and 139A, while the gear 133B controls a third, three-position valve unit 139B. These units are substantially identical and may be described by reference to one of them, say, the unit 139B, which is best shown in FIGURE 7. The gear 133B for the unit 139B is pinned to a rearwardly extending shaft 134 journaled in the mounting block 120. The shaft is sealed by an O-ring 135 and is attached to a coaxial valve stem 136 by a pin 134A. The stem 136 floats within a valve chamber 137 in the block 120 with sufficient clearance to form a passage for fluid under pressure admitted through a connecting passage 138.

In the three-way valve unit illustrated, there are three plug elements 140, 141 and 142. These elements are respectively installed in three spaced holes drilled in the mounting block 120 perpendicular to the main valve chamber 137. Each element includes a ball 145 which engages the valve stem 136 and rests in a concave recess in one end of a hexagonal piston 143 loosely mounted in the corresponding hole. The piston includes an annular groove adjacent this end, and the groove accommodates an O-ring type of resilient gasket which, in the closed position of the plug element, engages a beveled surface of the plug-body to seal off the passage of fluid. The piston is urged into the closed position by a coil spring 147 which engages the opposite piston end and is held in compression by a screw cap 149. A further O-ring gasket 148 is used under this cap for sealing against leakage. Connection with the interior of the plug element is provided by a passage 150.

The end of the valve stem 136 opposite that affixed to the gear shaft 134 is counterbored to form a recess 157 which loosely receives a bearing pin 158. This pin is fixed in a removable plate 159 which is fastened with screws 159A (FIGURE 6) and with an interposed sealing gasket 159B, in a recessed portion of the rear of the mounting lock 120. The stem 136 "floats" on the bearing pin 148 and the shaft 134, to enable easy assembly of the valve components and to allow for a reasonable amount of misalignment.

The valve units 140 and 141 are coaxially aligned on opposite sides of the valve stem 136 adjacent the forward end thereof, while the valve unit 142 is spaced rearwardly of the unit 141 along a parallel axis. As best shown in FIGURE 7A, the balls 145 of the units 140 and 141 are spring-biased toward a groove 153 which extends around a substantial portion of the valve stem periphery. As best shown in FIGURE 7B, the ball 45 for the unit 142 is spring-biased toward one of two oppositely disposed grooves 151 and 152 which are disposed on the adjacent portion of the valve stem and which each transcribe a peripheral arc that is somewhat less than that of the groove 153. In these figures, the three positions of the stem 136 are indicated by the letters C, M and A, respectively corresponding to the "Cascade," "Manual" and "Automatic" positions of the switch knob 27 (FIGURE 1). In position C (the position shown) the balls 145 for the valve units 140 and 142 rest in the grooves 153 and 151, respectively, and the springs 147 for the units 140 and 142 maintain the correspondong O-rings 144 up against their seats to hold these valves closed. The ball 145 for the valve unit 141, on the other hand, rests on the outer surface of the valve stem in position C to permit the passage of fluid between the chamber 138 and the chamber 150 for unit 141. Upon the rotation of the stem 136 ninety degrees in a clockwise direction, as viewed in FIGURES 7A and 7B, to position M, the ball 145 for the valve unit 140 remains in the groove 153 to hold unit 140 closed, while the ball 145 for the valve unit 141 moves into the groove 153 to close unit 141 and that for the valve unit 142 rides out of the groove 151 to move unit 142 to its open position, thus permitting the passage of fluid between the chamber 138 and the chamber 150 for unit 142. Upon the clockwise rotation of the valve stem a further ninety degrees to position A, the valve unit 40 opens, the unit 141 remains closed and the unit 142 moves from its open position to its closed position, thereby enabling the transmission of fluid between the chamber 138 and the chamber 150 for the valve unit 140. The arrangement is such that, for each valve position, chamber 138 is connected to the chamber 150 for one of the valve units, while the chambers 150 for the other two units are blocked.

*Pressure regulator*

The adjusting knob 23 (FIGURES 1 and 3) controls the pressure regulator 125 to establish an output fluid pressure at any of a range of values. An elongated shaft 160 transmits the movements of the knob 23 to the regulator 125. As best shown in FIGURE 8, this shaft is journaled in a support 161 and is prevented from axial movement by a collar 162 pinned to the shaft. An extension 163 of the shaft 160 is threaded and is journaled in a recess in the rear of the support 161. A carriage 164 engages the extension 163 and is prevented from turning therewith by guides 167 carried by the support 161. Fixed to the carriage is an actuator 165 which moves in a longitudinal direction in response to rotation of the knob 23. Bearing against the actuator 165 is a pin 166 which is slidably movable in a mating aperture in the block 120 to transmit the actuator motion to the regulator 125.

The regulator valve 125 includes a compression spring 170 which is mounted within the block 120 coaxially with the pin 166. The position of the carriage 164 is transmitted to the spring 170 through the cooperation of the actuator 165, the pin 166 and a spring cap 171. The pressure exerted by this spring in accordance with the position of the carriage acts on a spacer 172 which is suspended between two spaced, substantially parallel diaphragms 173 and 174 which define a chamber 175 therebetween. The center portions of these diaphragms are respectively clamped to opposite ends of the spacer, and the chamber 175 is connected to the atmosphere by a vent opening 177. The chamber 175 also is connected to a second chamber 179 through a passage 180 in a member 176 carried by the diaphragm 174. A compression spring 178 acts against the member 176 and opposes the spring 170 through the agency of the spacer 172. The passage 180 is more or less obstructed by one end of a stem 181 which is formed to cooperate with a bevel-seat surrounding the passage. The stem 181 is double-skirted, and its opposite end extends into a further chamber 183 defined by a cap 182 and a barrier plate 184, the latter of which is integrally formed with a section of the block 120 and loosely supports the stem. The plate 184 is drilled and beveled to cooperate with the second skirt on stem 181. This block section is provided with an outlet passage 185 opening into the chamber 179 and an inlet passage 186 which opens into the chamber 183.

Fluid under pressure is supplied from a suitable source (not shown in FIGURE 8) to the inlet passage 186. An will be understood, a dynamic equilibrium is established between the pressure of the spring 170, acting on one end of the spacer 172, and the combined pressure of the opposed spring 178 and that in the chamber 179, acting on the opposite side of the spacer. The pressure in the outlet passage 185 is maintained at a constant value which is quickly and easily adjusted by varying the position of the control knob 23 (FIGURES 1 and 3), to vary the compression of the spring 170.

Figure 9:
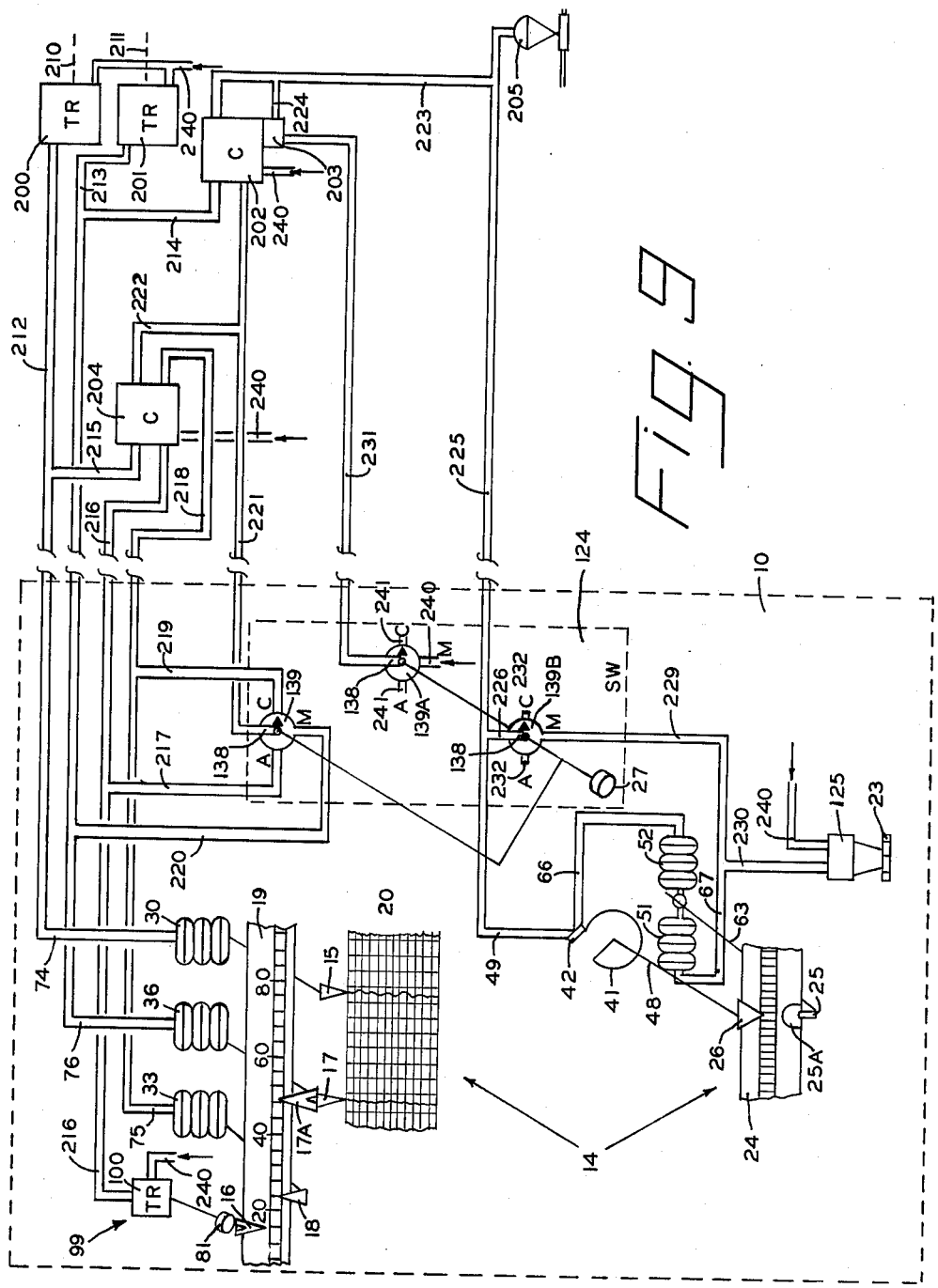
FIGURE 9 is a schematic flow diagram of a pneumatic control system in accordance with the invention.

*Figure 9*

A typical control system in accordance with the invention is illustrated schematically in FIGURE 9. In this figure there are shown schematically the several components of the instrument 10, including the indicating and recording mechanism 14, the pressure transmitting mechanism 99, the pressure switching assembly 124 and the pressure regulator 125. The transmitter 99 and the switching assembly 124 have been identified by the symbols TR and SW, respectively, in FIGURE 9.

The control system of FIGURE 9 also includes interconnecting piping between the various components of the instrument as well as piping to external elements of the system. These external elements are remotely located with respect to the instrument. The system is arranged for remotely set control action in which the controlled medium is under regulation by a final control element, such as pneumatically-actuated valve 205, which is actuated by the output pressure of a controller 202 identified by the symbol C. This controller is of conventional construction and is arranged for "cascade" operation, that is, series, or "slave," operation with respect to another controller 204 (called the primary, or "master" controller), also identified by the symbol C, by which its set point is automatically adjusted.

Provisions are made in the control system for the measurement of two variable quantities. One of these, the primary variable, is associated with the master controller 204 and is transmitted through a line indicated schematically at 210 to a pressure transmitter unit 200 identified by the symbol TR, by which the signal, be it electrical, mechanical, etc., is converted to air pressure proportioned to its magnitude. Similarly, the secondary variable is transmitted through a line shown schematically at 211 to a pressure transmitter unit 201, also identified by the symbol TR, where it is converted to proportional pressures representative of the variable signal. Each of the units 200 and 201 is supplied from a source of air at constant, regulated pressure, illustratively 20 p.s.i., through a conduit 240.

The output of the pressure unit 200, called the "Primary measurement," is conducted by a pipe 212 to the instrument 10, where it is transmitted by the conduit 74 to the sensitive bellows 30 in the indicating and recording mechanism 14. The value of this measurement is recorded by the pen 15 on the chart 20 in a manner similar to that outlined heretofore. The primary measurement is also conducted through a branch line 215 to the input of the primary controller 204.

The output from the pressure unit 201, the "Secondary" measurement, is conducted through lines 213 and 214 to the input of the "slave" controller 202. It is also carried through the line 213 to the conduit 76 in the instrument 10 and from this conduit to the bellows 36, by which the value of the secondary variable is recorded by the pen 17 on the chart 20 and is indicated by the pointer 17A on the scale 19.

As will be understood, the primary controller 204 produces an output which is a function of the deviation of the primary measurement in the input line 215 from a predetermined reference value. This reference pressure is supplied to the controller 204 from the pressure source 240, the pressure transmitting mechanism 99 and a line 216.

The output of the controller 204 is conducted to the instrument 10 through line 218, where it is led through the conduit 75 to the bellows 33 which actuates the indicator 18. The controller output also is conducted by a branch line 219 in instrument 10 to the valve unit 139 in the switching assembly 124. As indicated heretofore, the assembly 124 includes three of these valve units (139, 139A and 139B) which are each arranged to connect one of three passages respectively corresponding to the "Cascade," "Manual" and "Automatic" positions of the control knob 27, to the associated chamber 138. The branch line 219 is connected to the passage of the valve unit 139 corresponding to the "Cascade," or C position of the knob 27. With the knob in this C position (the position shown), the controller output is supplied from the line 219 to the chamber 138 for unit 139 and from this chamber through a line 221 to the "slave" controller 202, where it positions the set points thereof. A branch 222 of the line 221 is fed back to the master controller 204 to close the control loop of that unit in order to effect stable controller action. Slave controller 202 thus has its set point fixed by the output of the master controller 204.

The output of the slave controller 202 is conducted through an interposed on-off relay 203 of conventional design and lines 224, 223 and 225 to the final control element, that is, the valve 205. A portion of the line 223 also serves as the usual feed-back branch which conducts the output pressure back to the controller 202 to complete the control loop. The relay 203 is connected by a control line 231 to the chamber 138 in the valve unit 139A of the instrument. The passages of this valve unit corresponding to position A and C are vented, while the passage corresponding to position M is supplied with air under constant pressure, for purposes that will become more fully apparent hereafter. With the unit 139A in position C, as shown, the chamber 138 is connected to the atmosphere, and the relay 203 is maintained in its normally open position to permit the slave controller 202 to regulate the valve 205 in accordance with the primary and secondary measurements.

The value of the pressure at the control valve 205 is transmitted to the instrument 10 over a line 225 which is connected to the conduit 49 leading to the block 42 for the Bourdon tube 41. The Bourdon tube 41 cooperates with the indicator pointer 26 and the scale 24 to show the value of the control pressure, and hence the position of the valve 205. As indicated heretofore, the block 42 is connected through a conduit 66 to the pressure-sensitive bellows 52, thus supplying the control valve pressure to the bellows 52. The opposed bellows 51 is supplied with air under constant pressure from the supply line 240, the pressure regulators 125, a line 230 and the conduit 67. The deviation of the pointer 25 controlled by the bellows 51 and 52 from a fixed target area 25A on the scale 26 thereby provides an indication of the difference between the reference pressure and the pressure at the control valve 205.

In situations in which it is desired to operate the instrument 10 manually to control the control valve 205, the switch knob 27 is moved to its M position. As the knob 27 reaches this position, the valve unit 139 supplies the secondary measurement signals in the line 213 directly to the set point connection of the slave controller 202 through a line 220, the passage in the unit 139 corresponding to the M position of the knob, the chamber 138 and the line 221, thereby equalizing the deviation producing mechanism of the slave controller. Simultaneously, the switch unit 139A connects the pressure source 240 to the relay 203 to inactivate this relay and thus effectively cut the slave controller out of service, while the valve unit 139B supplies pressure from the regulator 125, the line 230, a conduit 229 leading to the unit 139B, a line 226 connected to the valve unit chamber 138 and the line 225 to the control valve 205. The position of the control valve is determined by the position of the manually operated regulator knob 23 and is indicated on the scale 24 by the pointer 26.

Under certain operating conditions, it is desirable to control the valve 205 from the slave controller only. To accomplish this, the switch knob 27 is moved to its "Automatic," or A, position. In this position, the valve unit 139B blocks the supply of regulator pressure to the valve 205, and the valve unit 139A vents the line 231, leading to the relay 203. The valve unit 139 supplies set point pressure to the slave controller from the pressure transmitting mechanism 99, the line 216, a line 217 connected to the A passage of the unit 139, the corresponding chamber 138 and the line 221. The slave controller thereupon takes over automatic control of the control valve 205.

In transferring control from "Cascade" or "Automatic" to (or through) "Manual," the fluid pressure in the output line 224 of the slave controller 202 and that from the regulator 125 advantageously are equalized prior to the instant of transfer, to thereby avoid "bumping" the control valve 205. To effect this equalization, the regulator knob 23 is adjusted until the indicator 25 is superimposed over the target area 25A, thus insuring that these pressures are the same at the time of transfer. As a result of the preliminary adjustment of pressure, there is no sudden disturbance of the position of the valve 205 or, consequently, of the controlled process, as the switch knob 27 is moved to its new position.

In order to avoid "bumping" the process through sudden operation of the control valve 205 upon the transfer from "Manual" to "Automatic" operation, a preliminary adjustment is made to match the set point pressure from the pressure transmitting mechanism 99 and the secondary variable pressure in the slave controller input line 214, thereby insuring that the slave controller output is the same as the pressure in line 223 and hence that the pressure at valve 205 is the same, both after as well as before the transfer. To effect this adjustment, prior to the transfer the transmitting mechanism control knob 81 is moved until the position of the indicator 16 thereon coincides with that of the secondary variable indicator 17A. Alternatively, the adjustment may be accomplished by manipulating the regulator knob 23, again prior to the transfer, until the resulting changes in the controlled medium affect the secondary variable pressure on lines 213 and 214 and bring it into conformity with the pressure from the mechanism 99, as indicated by the coincidence of the indicators 16 and 17A.

In cases in which it is desired to transfer from "Manual" to "Cascade" operation, the system is again adjusted to insure that the pressure at valve 205 is the same, both after as well as before the transfer. In one way of accomplishing this latter adjustment, before the switch knob 27 is moved to the C position the set point pressure is varied by the knob 81 until the position of the primary controller output indicator 18 coincides with the secondary variable indicator 17A. In another way of effecting the adjustment, the regulator knob 23 is operated to vary the secondary variable pressure until the indicator 17A has moved into line with the indicator 18.

A significant disadvantage of prior art systems of this class has been the requirement of a "seal" position interposed between transfer operations. In such prior systems, means have been provided to entrap air in the pressure line leading to the control valve at its last-regulated pressure in order that there be no abrupt change in pressure as the new conditions are introduced. In the present system, provision is made for equalizing the pressure conditions before switching is effected, thus dispensing with the troublesome intermediate "seal" condition. As a result, the final control valve at all times is directly connected in controllable relationship with either the manual regulator 23 or the output of the slave controller 202.

It will be obvious to those skilled in the art that a variety of other combinations of switches and switching operations are possible in control systems constructed in accordance with the invention. Such systems, with the cooperation of the visual indications and manual adjustments, provide a particularly convenient and versatile indicating, recording and controlling apparatus without requiring intermediate switching positions for sealing. The juxtaposition of indicating members and fixed scales provide for easy identification and matching without sacrifice of space and demountability of component parts.

The terms and expressions which have been employed are used as terms of description and not of limitation, and there is no intention in the use of such terms and expressions, of excluding any equivalents of the features shown and described, or portions thereof, it being recognized that various modifications are possible within the scope of the invention claimed.

What is claimed is:

1. A fluid-actuated control system for indicating the magnitude of a variable condition and for operating a final control element, comprising, in combination, condition-sensitive means for producing a first pressure signal representative of said magnitude, first indicating means responsive to said condition-sensitive means for providing an indication of said magnitude, regulatory means for producing a second pressure signal, valve means for selectively applying said first or said second pressure signal to said final control element, application of said first signal to said control element automatically controlling the same in accordance with the magnitude of said variable condition, application of said second signal to said control element enabling the manual control thereof by said regulatory means, second indicating means for providing an indication of said second signal, first adjustment means operatively associated with said condition-sensitive means and cooperating with said first indicating means for equalizing said first and second pressure signals preparatory to the operation of said valve means to control said control element automatically, and second adjustment means comprising said regulatory means and supplied with both the pressure from said control element and with the pressure produced by said regulatory means for all positions of said valve means for equalizing said first and second pressure signals preparatory to the operation of said valve means to control said control element manually.

2. A fluid-actuated control system for indicating the magnitude of a variable condition and for operating a final control element, comprising, in combination, condition-sensitive means for producing a first pressure signal representative of said magnitude, first indicating means responsive to said condition-sensitive means and including an exhibiting member for providing an indication of said magnitude, manually operable regulatory means for producing a second pressure signal, switching means for selectively applying said first or said second pressure signal to said final control element, application of said first signal to said control element automatically controlling the same in accordance with the magnitude of said variable condition, application of said second signal to said control element enabling the manual control thereof by said regulatory means, second indicating means for providing an indication of said second signal, first adjustment means operatively associated with said condition-sensitive means for equalizing said first and second pressure signals preparatory to the operation of said switching means to control said control element automatically, said first adjustment means including a first index member cooperating with said first indicating means and movable into correspondence with said exhibiting member to equalize said first and second pressures, and second adjustment means supplied with both the pressure from said control element and the pressure produced by said manually operable regulatory means for all positions of said switching means, said second adjustment means permitting control of said regulatory means to equalize said first and second pressure signals preparatory to the operation of said switching means to control said control element manually, said second adjustment means including a second index member cooperating with said second indicating means to provide an indication of the difference between said first and second pressures.

3. A fluid-actuated control system for indicating the magnitude of a variable condition and for operating a final control element, comprising, in combination, condition-sensitive means for producing a first pressure signal representative of said magnitude, manually operable regulatory means for producing a second pressure signal, exhibiting apparatus including first and second indicating means, said first indicating means being responsive to said condition-sensitive means for providing an indication of said first signal and said second indicating means being responsive to said regulatory means for providing an indication of said second signal, switching means adjacent said exhibiting apparatus for selectively applying said first or said second pressure signal to said final control element, application of said first signal to said control element automatically controlling the same in accordance with the magnitude of said variable condition, application of said second signal to said control element enabling the manual control thereof by said regulatory means, first adjustment means operatively associated with said condition-sensitive means for equalizing said first and second pressure signals preparatory to the operation of said switching means to transfer control from manual to automatic operation, and second adjustment means comprising said regulatory means and supplied with both the pressure from said control element and with the pressure produced by said regulatory means and for all positions of said switching means, for equalizing said first and second pressure signals preparatory to the operation of said switching means to transfer control from automatic to manual operation.

4. A control system of the character set forth in claim 3, in which said exhibiting apparatus includes a linearly movable strip-chart in juxtaposition with said first indicating means for providing a record of the magnitude of said variable condition.

5. A control system of the character set forth in claim 4, in which said first indicating means includes a scale element and an exhibiting member controlled by said condition-sensitive means, said exhibiting member cooperating with said scale element and said chart to indicate and record the magnitude of said variable condition.

6. In a control system of the character set forth in claim 5, means for supporting said exhibiting apparatus, said switching means and said first and second adjustment means on a panel member, and means for maintaining said chart in rigid but removable relationship with said support means, to permit withdrawal of said chart without interfering with the automatic control functions of the system.

7. A fluid-actuated control system for indicating the magnitude of a variable condition and for operating a final control element, comprising, in combination, condition-sensitive means for producing a fluid pressure proportional to said magnitude, first indicating means responsive to said condition-sensitive means and including a first exhibiting member for providing an indication of said magnitude, controller means connected to said condition-sensitive means for producing a first pressure signal related to said fluid pressure, manually operable regulatory means for producing a second pressure signal, switching means for selectively applying said first or said second pressure signal to said final control element, application of said first signal to said control element automatically controlling the same in accordance with the magnitude of said variable condition, application of said second signal to said control element enabling the manual control thereof by said regulatory means, second indicating means including a second exhibiting member for providing an indication of said second signal, first adjustment means operatively associated with said condition-sensitive means and cooperating with said first indicating means for equalizing said first and second pressure signals preparatory to the operation of said switching means to control said control element automatically, and second adjustment means comprising said regulatory means and supplied with both the pressure from said control element for all positions of said switching means and with the pressure produced by said regulatory means for varying said second signal, to equalize said first and second pressure signals preparatory to the operation of said switching means to control said control element manually.

8. A fluid-actuated control system for indicating the magnitudes of a plurality of variable conditions and for operating a final control element, comprising, in combination, first and second condition-sensitive means for producing first and second fluid pressures respectively representative of said magnitudes, indicating means responsive to each of said condition-sensitive means for providing an indication of the magnitudes of said conditions, controller means connected to each of said condition-sensitive means for producing a first pressure signal related to one of said first and second pressures, manually operable means for producing a second pressure signal, switching means for selectively connecting said first or said second pressure signal to said final control element, connection of said first signal to said control element automatically controlling the same in accordance with the magnitude of one of said variable conditions, connection of said second signal to said control element enabling the manual control thereof by said manually operable first adjustment means cooperating with said indicating means for conditioning the system for automatic operation, and second adjustment means supplied with both the pressure from said control element and the pressure produced by said manually operable means for all positions of said switching means for conditioning the system for manual operation.

9. A fluid-actuated control system for indicating the magnitudes of a plurality of variable conditions and for operating a final control element, comprising, in combination, first and second condition-sensitive means for producing first and second fluid pressures respectively representative of said magnitudes, first indicating means responsive to each of said condition-sensitive means for providing indications of said magnitudes, first controller means connected to said first condition-sensitive means for producing a third fluid pressure related to said first pressure, second controller means connected to said first controller means and to said second condition-sensitive means, said second controller means producing a first pressure signal in response to the application thereto of said third fluid pressure and producing a second pressure signal upon the application thereto of said second fluid pressure, manually operable regulatory means for producing a third pressure signal, switching means including a multi-position valve element for selectively applying said first, said second or said third pressure signal to said final control element, application of said first signal to said control element automatically controlling the same in accordance with the magnitude of a first of said variable conditions, application of said second signal to said control element automatically controlling the same in accordance with the magnitude of a second of said variable conditions, application of said third signal to said control element enabling the manual control thereof by said regulatory means, second indicating means for providing an indication thereon of said third signal, first adjustment means operatively associated with said first controller means and cooperating with said first indicating means for conditioning the system for transfer from manual operation under the control of said third pressure signal to automatic operation under the control of said first or second pressure signal, and second adjustment means supplied with pressure from said control element and cooperating with said second indicating means for conditioning the system for transfer from automatic operation under the control of said first or second pressure signal to manual operation under the control of said third pressure signal.

10. In a fluid-actuated control system for operating a final control element, in combination, regulatory means for producing a pressure signal, manually operable valve means for alternately connecting and disconnecting said regulatory means to said final control element, to supply said pressure signal to said control element to operate the same at preselected points, pressure sensitive means including a pair of opposed pressure elements respectively responsive to the pressure at said control element for all positions of said valve means and the pressure produced by said regulatory means, and indicating means including an exhibiting member connected between said opposed pressure elements so as to respond only to the difference between said pressures.

11. In a fluid-actuated control system for operating a final control element, in combination, manually operable regulatory means for producing a pressure signal, means including a multi-position control valve for connecting said regulatory means to said final control element, to supply said pressure signal to said control element to operate the same when said valve is in one of its positions, first pressure sensitive means responsive to the pressure at said control element for all positions of said valve, second pressure sensitive means responsive to both the pressure at said control element and the pressure produced by said regulatory means for all positions of said valve, and indicating means including a first and second exhibiting member and a common scale therefore, said first exhibiting member being operatively connected with said first pressure sensitive means to provide an indication on said scale of the pressure at said control element, said second exhibiting member being operatively connected with said second pressure sensitive means to provide an indication on said scale of the relationship between the pressure at said control element and the pressure produced by said regulatory means.

12. In a fluid-actuated control system for operating a final control element, in combination, manually operable regulatory means for producing a pressure signal, means including a multi-position control valve for connecting said regulatory means to said final control element, to supply said pressure signal to said control element to operate the same when said valve is in one of its positions, first pressure sensitive means in fluid conducting relation with said control element and responsive to the pressure thereat for all positions of said valve, second pressure sensitive means including a pair of opposed pressure elements respectively responsive to the pressure at said control element and the pressure produced by said regulatory means for producing a difference pressure for all positions of said valve, and indicating means including a scale element and a first and second exhibiting member cooperating therewith, said first exhibiting member being operatively connected with said first pressure sensitive means to provide an indication on said scale of the pressure at said control element, said second exhibiting member being operatively connected with said second pressure sensitive means to provide an indication on said scale of the changes in said difference pressure from a predetermined reference position.

13. A fluid-actuated control system of the character set forth in claim 12, in which each of said pressure elements includes a deflectable portion, said second pressure sensitive means having an elongated bridge member connected to said second exhibiting member and in engagement with each said deflectable portion.

14. A fluid-actuated control system of the character set forth in claim 13, in which said pressure elements are disposed in side-by-side relationship with each other, said bridge member being pivotally supported intermediate said pressure elements.

15. A fluid-actuated control system of the character set forth in claim 13, in which said first pressure sensitive means comprises a Bourdon tube element having its free end connected to said first exhibiting member.

16. A fluid-actuating control system for operating a final control element, comprising, in combination, condition-sensitive means for producing a first pressure signal representative of the magnitude of a variable condition, manually operable regulatory means for producing a second pressure signal, valve means for selectively applying said first or said second pressure signal to said final control element, application of said first signal to said control element automatically controlling the same in accordance with the magnitude of said variable condition, application of said second signal to said control element enabling the manual control thereof by said regulatory means, first adjustment means operatively associated with said condition-sensitive means for conditioning the system for the operation of said valve means to transfer control from manual to automatic operation, and second adjustment means for conditioning the system for the operation of said valve means to transfer control from automatic to manual operation, said second adjustment means including a pair of opposed pressure elements respectively responsive to the pressure at said control element and said second pressure signal for all positions of said valve means and including exhibiting means operatively connected with said pressure elements for providing an indication of the relationship between said control element pressure and said second pressure signal.

17. A fluid-actuated control system for indicating the magnitude of a variable condition and for operating a final control element, comprising, in combination, condition-sensitive means for producing a fluid pressure proportional to the magnitude of said variable condition, first indicating means responsive to said condition-sensitive means for providing an indication of said magnitude, controller means connected to said condition-sensitive means for producing a first pressure signal representative of said fluid pressure, manually operable regulatory means for producing a second pressure signal, valve means for selectively applying said first or said second pressure signal to said final control element, application of said first signal to said control element automatically controlling the same in accordance with the magnitude of said variable condition, application of said second signal to said control element enabling the manual control thereof by said regulatory means, first adjustment means operatively associated with said condition-sensitive means and cooperating with said first indicating means for varying said first pressure signal, to permit equalization of said first and second signals preparatory to the operation of said valve means to transfer control from manual to automatic operation, and second adjustment means supplied with pressure from said final control element for permitting control of said regulatory means to vary said second pressure signal, to enable equalization of said first and second signals preparatory to the operation of said valve means to transfer control from automatic to manual operation, said second adjustment means including a pair of opposed pressure elements respectively responsive to the pressure at said control element and to said second pressure signal for all positions of said valve means to produce a difference pressure, and including second indicating means operatively connected with said pressure elements to provide an indication of the changes in said difference pressure from a predetermined reference position.

18. A fluid-actuated control system for indicating the magnitudes of a plurality of variable conditions and for operating a final control element, comprising, in combination, first and second condition-sensitive means for producing first and second fluid pressures respectively representative of said magnitudes, first indicating means responsive to each of said condition-sensitive means for providing indications of said magnitudes, first controller means connected to said first condition-sensitive means for producing a third fluid pressure related to said first pressure, second controller means connected to said first controller means and to said second condition-sensitive means, said second controller means producing a first pressure signal in response to the application thereto of said third fluid pressure and producing a second pressure signal upon the application thereto of said second fluid pressure, manually operable regulatory means for producing a third pressure signal, valve means for selectively applying said first, said second or said third pressure signal to said final control element, application of said first signal to said control element automatically controlling the same in accordance with the magnitude of the first said variable conditions, application of said second signal to said control element automatically controlling the same in accordance with the magnitude of the second of said variable conditions, application of said third signal to said control element enabling the manual control thereof by said regulatory means, second indicating means for providing an indication of said third signal, first adjustment means operatively associated with said first controller means and cooperating with said first indicating means for conditioning the system for the operation of said valve means to transfer control from manual operation under the control of said third pressure signal to automatic operation under the control of said first or second pressure signal, and second adjustment means supplied with pressure from said control element for conditioning the system for the operation of said valve means to transfer control from automatic operation under the control of said first or second pressure signal to manual operation under the control of said third pressure signal, said second adjustment means including a pair of opposed pressure elements respectively responsive to the pressure at said control element and to said third pressure signal and including third indicating means operatively connected with said pressure elements for providing an indication of the relationship between said control element pressure and said third pressure signal.

19. A fluid-actuated control system for indicating the magnitude of a variable condition and for operating a final control element, comprising, in combination, condition-sensitive means for producing a first pressure signal representative of said magnitude, manually operable regulatory means for producing a second pressure signal, exhibiting apparatus including a linearly movable strip chart and first and second indicating means, said first indicating means including a scale element and an exhibiting member controlled by said condition-sensitive means for providing an indication of said first pressure signal and said second indicating means being responsive to said regulatory means for providing an indication of said second pressure signal, said strip chart being located in juxtaposition with said first indicating means for providing a record of the magnitude of said variable condition, said exhibiting member cooperating with said scale element and said chart to indicate and record the magnitude of said variable condition, switching means adjacent said exhibiting apparatus for selectively applying said first or said second pressure signal to said final control element, application of said first pressure signal to said final control element automatically controlling the same in accordance with the magnitude of said variable condition, application of said second pressure signal to said final control element enabling the manual control thereof by said regulatory means, first adjustment means operatively associated with said condition-sensitive means and cooperating with said first indicating means for conditioning the system for the operation of said switching means to transfer control from manual to automatic operation, second adjustment means supplied with pressure from said final control element and cooperating with said second indicating means for conditioning the system for the operation of said switching means to transfer control from automatic to manual operation, a support for said exhibiting apparatus, a chassis assembly for maintaining said scale element and said chart in fixed relationship with each other, and means for releasably securing said chassis assembly to said support, to permit withdrawal of said scale element and said chart from said second indicating means.

20. A fluid-actuated control system for indicating the magnitude of a variable condition and for operating a final control element, comprising, in combination, condition-sensitive means for producing a fluid pressure proportional to said magnitude, first indicating means responsive to said condition-sensitive means and including a first exhibiting member for providing an indication of said magnitude, controller means connected to said condition-sensitive means for producing a first pressure signal related to said fluid pressure, manually operable regulatory means for producing a second pressure signal, switching means for selectively applying said first or said second pressure signal to said final control element, application of said first signal to said control element automatically controlling the same in accordance with the magnitude of said variable condition, application of said second signal to said control element enabling the manual control thereof by said regulatory means, said switching means including a multi-position valve having an elongated valve chamber and a stem member loosely disposed within said chamber, said valve including means for pivotally supporting said stem member within said chamber at opposite ends thereof, second indicating means including a second exhibiting member for providing an indication of said second signal, first adjustment means operatively associated with said condition-sensitive means and cooperating with said first indicating means for equalizing said first and second pressure signals preparatory to the operation of said switching means to control said control element automatically, and second adjustment means comprising said regulatory means and supplied with pressure from said control element for all positions of said switching means for varying said second signal, to equalize said first and second pressure signals preparatory to the operation of said switching means to control said control element manually.

References Cited by the Examiner

UNITED STATES PATENTS

| | | | |
|---|---|---|---|
| 2,369,887 | 2/45 | Eckman. | |
| 2,637,342 | 5/53 | Shannon | 251—26 |
| 2,638,117 | 5/53 | Horn | 251—121 X |
| 2,664,915 | 1/54 | Drinker | 251—26 |
| 2,706,994 | 4/55 | Moore | 137—85 |
| 2,747,595 | 5/56 | Dickey | 137—82 |
| 2,805,037 | 9/57 | Bruce | 251—25 |
| 2,872,149 | 2/59 | Battey et al. | 251—25 |
| 3,126,903 | 3/64 | Hart et al. | 137—84 |

M. CARY NELSON, *Primary Examiner.*

MARTIN P. SCHWADRON, *Examiner.*